(12) United States Patent
Höglund

(10) Patent No.: US 7,995,107 B2
(45) Date of Patent: Aug. 9, 2011

(54) ENHANCEMENT OF IMAGES

(75) Inventor: Tobias Höglund, Linköping (SE)

(73) Assignee: Autoliv Development AB, Vargarda (SE)

( * ) Notice: Subject to any disclaimer, the term of this patent is extended or adjusted under 35 U.S.C. 154(b) by 545 days.

(21) Appl. No.: 12/114,558

(22) Filed: May 2, 2008

(65) Prior Publication Data
US 2010/0073498 A1 Mar. 25, 2010

Related U.S. Application Data

(63) Continuation of application No. PCT/SE2006/001231, filed on Nov. 1, 2006.

(30) Foreign Application Priority Data

Nov. 4, 2005 (GB) .................................. 0522594.1

(51) Int. Cl.
H04N 5/228 (2006.01)
G06K 9/40 (2006.01)
(52) U.S. Cl. ..................... 348/222.1; 348/452; 382/260; 382/262
(58) Field of Classification Search .................. None
See application file for complete search history.

(56) References Cited

U.S. PATENT DOCUMENTS

| | | | |
|---|---|---|---|
| 4,489,390 | A | 12/1984 | Parenti et al. |
| 4,571,635 | A | 2/1986 | Mahmoodi et al. |
| 5,790,205 | A | 8/1998 | Pettitt et al. |
| 2004/0227773 | A1 | 11/2004 | Hier et al. |

FOREIGN PATENT DOCUMENTS

| | | |
|---|---|---|
| GB | 2 303 757 A | 2/1997 |
| WO | WO 2007/053085 A2 | 5/2007 |
| WO | WO 2007/053085 A3 | 5/2007 |

OTHER PUBLICATIONS

International Search Report dated Jun. 2, 2007.
Great Britain Search Report dated Jan. 27, 2006.
International Search Report for PCT/SE2006/001231, Jul. 6, 2007.
Impoco, G. et al: "Adaptive reduction of the dynamics of HDR video sequences," Image Processing, 2005, ICIP 2005, IEEE International Conference on, Sep. 11-14, 2005, Genova, Italy, vol. I, p. 945-948, ISBN 0-7803-9134-9. See sections 3.1-3.3 and abstract.
Marsi, S. et al: "Image contrast enhancement using a recursive rational filter," 2004 IEEE International Workshop on Imaging Systems and Techniques, Stresa, Italy, May 14, 2004, p. 29-34, ISBN 0-7803-8591-8. See pp. 31-32 and abstract.

*Primary Examiner* — David L Ometz
*Assistant Examiner* — Angel L Garces-Rivera
(74) *Attorney, Agent, or Firm* — Brinks Hofer Gilson & Lione

(57) ABSTRACT

A method of obtaining a spatial low pass filtered images from the video output of a video camera operable to produce successive video frames in the form of pixelated 2D sensed images. Each of the sensed images has a first predetermined number of rows of pixels and a second predetermined number of columns of pixels. The method may include scanning the sensor array row by row, and deriving the value of each pixel of said low spatial frequency image in such a way that said low spatial frequency value of a pixel is dependent on at least all earlier scanned pixels of the current row and all earlier scanned rows, but is not dependent on the pixels of rows located below a pixel row which is a third predetermined number of rows below the current row, said third predetermined number being significantly less than said first predetermined number.

20 Claims, 3 Drawing Sheets

ENHANCEMENT OF IMAGES

CROSS REFERENCE TO RELATED APPLICATIONS

This application is a continuation of International Patent Application PCT/SE2006/001231 filed Nov. 1, 2006 and thereby claims the benefit of GB 0522594.1 filed Nov. 4, 2005.

SUMMARY OF THE INVENTION

This disclosure relates to an imaging means and in particular to the enhancement of images from electronic imaging means. The images may take the form of arrays of rows and columns of pixels and the brightness of any pixel or a brightness component of any pixel can be represented numerically, for example, digitally. The embodiments described are concerned with the enhancement of video images in which a moving scene is represented, in known manner, by a series of briefly presented images or frames.

Particularly some embodiments concern an infrared vision arrangement for automobiles in which an infrared camera is mounted on the front of the vehicle. For example, the camera may be mounted on the front bumper or behind the windscreen, views the area in front of the vehicle in infrared light. The camera produces corresponding video signals which, after processing, are used to drive a display visible to the driver, thus allowing the driver, in conditions of poor visibility in visible light, for example at night and/or in heavy rain or fog, to see the road ahead more clearly, and especially to see warm objects such as pedestrians or animals.

In developing an infrared video system of the kind referred to above for automotive purposes, the applicants have encountered certain problems. One group of such problems results in artifacts in the final image which take the form of relatively low, i.e. gradual, brightness gradients in the image.

As such one aspect of the disclosure provides an image enhancing method, and a corresponding apparatus, to remove or minimize such artifacts.

According to this aspect there is provided a method of obtaining a spatial low pass filtered images, herein also referred to as LF images, from the video output from a video camera comprising a sensor array and operable to produce successive video frames in the form of pixelated 2D images, also referred to herein as raw images. Each of said raw image has a first predetermined number of rows of pixels and a second predetermined number of columns of pixels. The method includes creating said LF images, (i.e. images only containing the lower spatial frequencies of said 2D images), from said raw or sensor images, in real time. The method may be characterized by scanning the sensor array row by row, and deriving the value of each pixel of said LF image, herein referred to as the LF value, in such a way that said LF value of a pixel is dependent on at least all earlier scanned pixels of the current row and all earlier scanned rows, but is not dependent on the pixels of rows located below a pixel row which is a third predetermined number of rows below the current row. The third predetermined number can be significantly less than said first predetermined number, for example being less than one fifth of said first predetermined number.

Preferably, as each pixel has a respective brightness value associated therewith, the method includes the steps of, in real time, deriving from said values for each said raw frame image, a set of values for corresponding low spatial frequency image, by processing the pixel rows in succession in an operation in which each pixel row is processed pixel by pixel and in which operation there is developed, for each pixel row of the raw image, a series of primary derived values, each of which is associated with a respective pixel of that row and each of which primary derived values depends on the value of the corresponding pixel of the raw image and also on the primary derived value associated with at least one preceding adjacent pixel of the raw image; and in which there is developed from said primary derived values respective secondary derived values, (also herein referred to as LF values) each of which is associated with a respective pixel of the raw image and each of which secondary derived values depends upon the said primary derived value associated with the pixel and also on a said secondary derived value associated with at least one adjacent pixel in the same column of the image, but in the previously processed pixel row, whereby said secondary values (LF values) constitute notional brightness values for the corresponding pixels of said low spatial frequency image.

Preferably said low frequency image is derived from said raw image by developing for each pixel row of the raw image, a series of primary derived values, each of which is associated with a respective pixel of that row and each of which primary derived values depends on the value of the corresponding pixel of the raw image and also on the primary derived value associated with at least one adjacent pixel of the raw image; by developing from said primary derived values respective secondary derived values, each of which is associated with a respective pixel of the raw image and each of which secondary derived values depends upon the said primary derived value associated with the pixel and also on a said secondary derived value associated with at least one adjacent pixel in the same column of the image, whereby said secondary values constitute notional brightness values for the corresponding pixels of said low frequency image.

According to another aspect there is provided an imaging apparatus including a video camera the output of which comprises a succession of frames each in the form of a pixelated 2D pixel array and processing means such as an image processor for deriving, in real time, from said output, respective enhanced image frames by the above method and display means for displaying, in real time, a corresponding enhanced video view of the scene viewed by the camera.

A further problem encountered in development of the infrared video apparatus concerned is that the operation of the infrared video camera itself, and heat from the vehicle, heats the window (provided for protection from the elements, for example) through which the camera views the scene ahead, to a temperature above ambient and the combination of rain and the heated window from which the camera views the scene may generate "flashes" in a sequence of video frames. Such a flash is a sudden change in overall brightness level, corresponding to a sudden change of DC level in an electrical signal derived from scanning of the scene raster fashion by the camera concerned. Thus, where the IR camera is mounted in front of the vehicle, if the warm "window" through which the camera views the scene ahead is hit by a splash of water, the water will be heated and the average intensity of the image, (since the camera also "sees" the warm water), will get higher. This problem may be alleviated by removing what is herein referred to as the DC-component, which corresponds to the (relatively) steady background brightness level.

Another aspect of the invention seeks to alleviate this problem by providing a method in which, for each frame, the overall brightness of an enhanced frame is reduced or increased according to the difference between the overall brightness for the corresponding pre-enhanced frame and the overall brightness of the preceding enhanced frame, by a predetermined factor.

BRIEF DESCRIPTION OF THE DRAWINGS

An embodiment of the invention is described below with reference to the accompanying drawings in which.

DETAILED DESCRIPTION

Figure 1A:
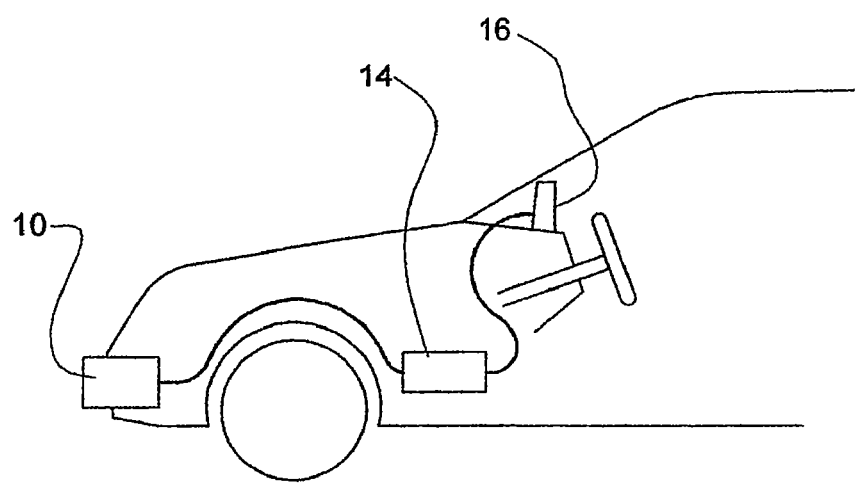
FIGS. 1a and 1b are diagrams showing an automobile having an infrared video apparatus embodying the invention.
Figure 1B:
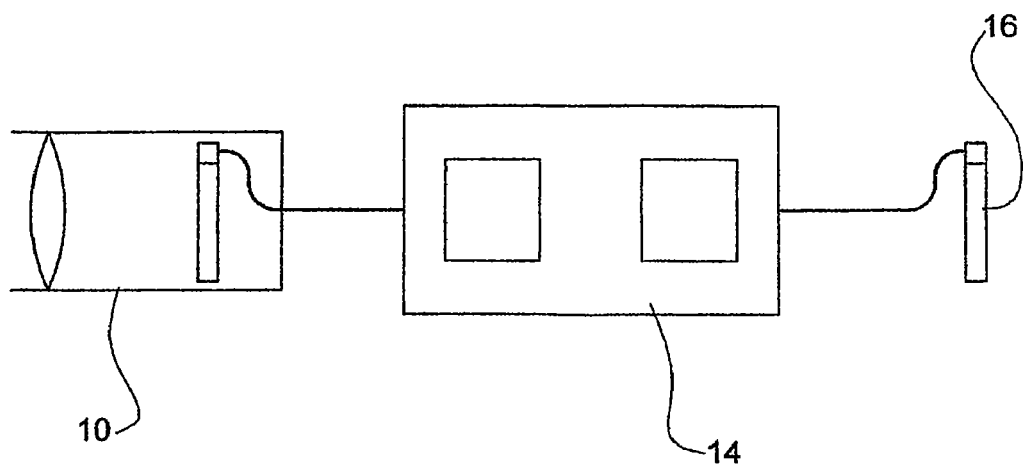

Referring to the drawings, an automobile infrared video system comprises an infrared camera 10 mounted at the front of the vehicle, for example on the bonnet or front bumper of the vehicle and protected from the environment by an infrared transparent window. The infrared camera 10, in known manner, provides electrical signals to processing means 14, such as an image processor. The electrical signals represent, digitally, respective instantaneous brightness values of respective pixels or picture elements of the image formed in the camera, such image being treated as an array or rows and columns of such pixels, in known manner. The camera 10 may, for example, provide 2D frames per second, each frame comprising such a 2D (two dimensional) array of pixels, comprising rows and columns of such pixels.

Processing means 14 processes the signals, or at least the information in these signals, in the manner described below, and provides, to a video display 16, driving signals such that the display 16 presents to the viewer, visibly, an enhanced version of the scene viewed in infrared by the camera.

With an infrared video system as described, without the image enhancement techniques the subject of the invention, there is a problem, as previously noted, in that, if the camera is mounted in front of the vehicle, if the warm window 12 of the camera is hit by a splash of water, the water will be heated and the average intensity of the image "scene" by the camera will rise suddenly. This problem may be alleviated by removing the "DC component" of the video signal, as mentioned above, and is also alleviated by the spatial high pass filtering described below.

In conventional practice, enhancement of pixelated images by filtering or "convolving" the image with a large Gaussian kernel. The larger the kernel, the more low pass components are removed. A large kernel is computationally demanding. One way to speed up computation is to make the kernel an averaging kernel. However, convolution techniques using such kernels are unsuitable for a video system for automobile use, because of limitations on the electronic memory which can be made available economically and, more particularly, the limited time available for processing the images, typically delivered at 30 frames per second as noted above.

The embodiment of the invention described below uses as a fast way of computing a low pass image is using a propagation scheme. The idea is basically to filter the lines and then the columns back and forth. When processing a row from left to right the following propagation rule is used:

$$f_{lp}(x,y) = (1-c) * f(x,y) + c * f_{lp}(x-1,y) \quad (1)$$

where $f_{lp}$ is initialized with the image f and c is called a conductivity factor and ranges from 0 to 1. A value of zero will not change the image at all, and a value of 1 will keep the start pixel during the whole propagation. The point of filtering each row/columns twice is that the zero phase is kept.

In the preferred embodiment, the pixel rows are filtered in both directions, but not the columns. The pixel columns are filtered downwards as the rows are being processed. This does however cause the columns filtered to shift in phase and this may cause artifacts on horizontal edges. However, the main purpose of the filter is to make a very "smooth" image, and this will still be the result, only shifted down somewhat.

The procedure can be described in terms of three passes as described below.

The resulting low pass image is then subtracted from the raw image to obtain a high pass image.

In the preferred embodiment, the raw data from the camera comprises, for each pixel, a brightness value represented digitally as a 14 bit binary number. The final image displayed may be a combination of the original image and the high pass image.

To make the filter output robust against sudden histogram shifts (rain flashes) the DC level is low pass filtered.

It will be understood that the infrared camera effectively produces each frame (at 30 frames per second) as a grey scale pixelated image comprising a certain number of rows and columns of pixels, in known manner. The camera 10 provides, by way of digital electronic signals, data to the processing unit 14 comprising a respective brightness value for each pixel of the video frame to be processed.

In operation, the camera 10 may operate effectively in accordance with a scanning raster, in which brightness data for successive pixel rows is fed from the camera to processing means 14 row by row. However, as indicated below the processing means 14 stores the brightness values for all pixels in a frame before processing that frame and supplies the process data frame by frame to the drive circuitry for the display 16. It will be understood that the infrared camera effectively produces each frame (at 30 frames per second) as a grey scale pixelated image comprising a certain number of rows and columns of pixels, in known manner. The camera 10 provides, by way of digital electronic signals, data to the processing unit 14 comprising a respective brightness value for each pixel of the video frame to be processed.

Figure 2A:
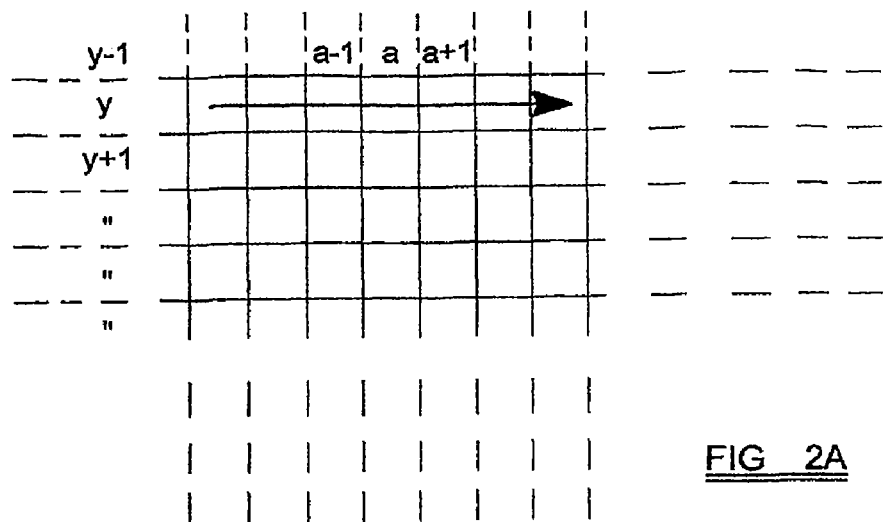
FIGS. 2A, 2B and 2C are diagrams illustrating an image enhancement process in accordance with the invention.

FIGS. 2A, B and C represent schematically the derivation of a low spatial frequency pixelated image from the raw image.

As noted above, the camera supplies brightness data for successive pixel rows to processing means 14 one pixel row after another, so that, for example, in each frame, the data for the row at the top of the image may be fed first to the processing means 14, then the data for the row below, and so on until the bottom row is reached, after which scanning of the next frame begins. Typically, the data for each pixel row may likewise be supplied to processor 14 pixel by pixel from one end of the row to the other.

Figure 2B:
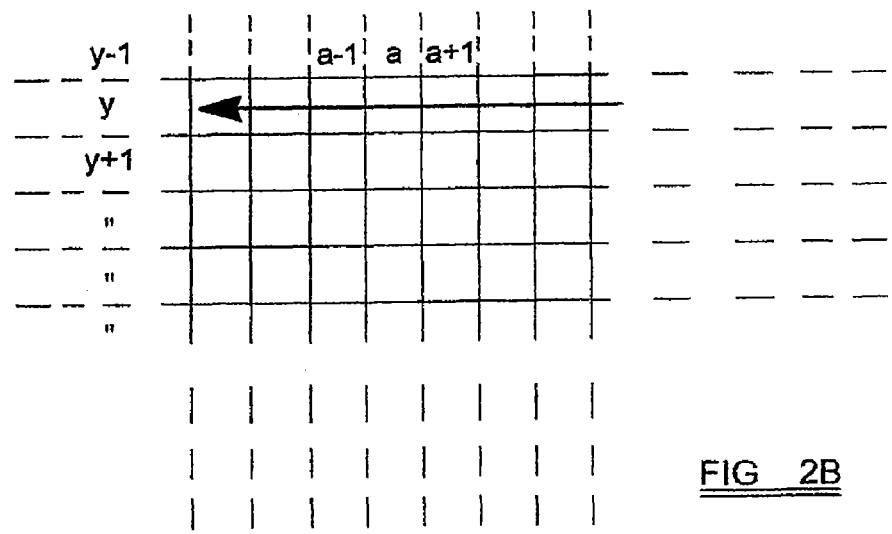

As noted above, and as explained later, in operation of the apparatus, each video frame from camera 10 is stored, a frame at a time, in processing means 14. Thus, at a given time t, there are stored in memory, in processing means 14, raw brightness values for each pixel of a given video frame. The processing means 14 processes this data as described below with reference to FIGS. 2A, 2B and 2C, which figures respectively illustrate a first pass, Pass 1; a second pass, Pass 2 and a third pass; Pass 3 of the processing procedure.

In the first pass, Pass 1, respective values herein referred to as intermediate derived values are established for each pixel in a notional counterpart, illustrated in FIG. 2A of the video frame to be processed, according to the equation:

Pass 1:

$$f_{L1}(x,y) = (1-c_x) * f(x,y) + c_x * f_{L1}(x-1,y) \quad (2)$$

by a reiterative process in which the values for successive pixels in the row are processed in accordance with this equation, and where $f_{L1}(x,y)$ is an intermediate value derived for the pixel in the x th position along the row y in question; f(x,y) is the raw image value for the associated pixel; $f_{L1}(x-1,y)$ is the intermediate value, established in a preceding iteration of the procedure, for the pixel which is the x−1 th pixel in the row, reckoned in said one direction, and $c_x$ is a constant conductivity factor, less than 1. Thus, at each iteration of the procedure the previous x becomes the new x−1 and so on until the last raw pixel value for the pixel row being processed has been reached.

In this pass, Pass 1, the process effectively progresses in a first direction along the pixel row, as indicated by the arrow in FIG. 2A. In a second pass, Pass 2, a similar reiterated process is carried out on the values for row y, resulting from Pass 1, but progressing in the opposite direction along the row as indicated by the arrow in FIG. 2B, with the resulting values, represented by row y in FIG. 2B, being herein referred to as the primary derived values.

Pass 2 is carried out according to the equation:

$$f_{L2}(x,y) = (1-c_x)*f_{L1}(x,y) + c_x*f_{L2}(x+1,y) \quad (3)$$

where $f_{L2}(x,y)$ is the primary derived value for the pixel in the x th position along the row y in question; still reckoned in said one direction, $f_{L1}(x,y)$ is the intermediate value for the associated pixel and $f_{L2}(x+1,y)$ is the primary derived value, established the preceding iteration of the Pass 2 procedure, for the pixel which is the x+1 th pixel in the row, still reckoned in said first direction.

Figure 2C:
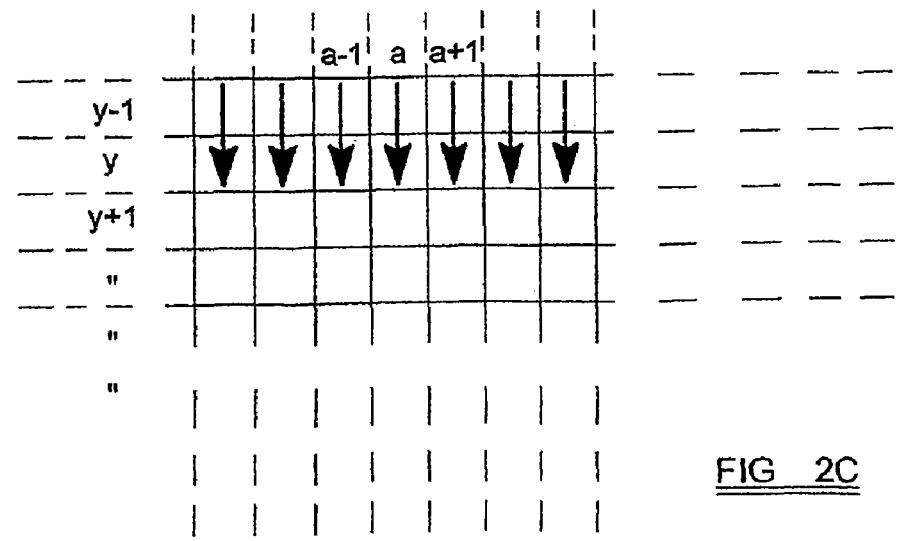

As a result of the next pass, Pass 3, a corresponding set of further values, represented by FIG. 2C, and herein referred to as secondary derived values are calculated, each said value corresponding to a respective pixel of a notional counterpart of the original frame represented by a respective rectangular cell in FIG. 2C. Pass 3 is carried out according to the equation:

$$f_{L3}(x,y) = (1-c_y)*f_{L2}(x,y) + c_y*f_{L3}(x,y-1) \quad (4)$$

where $f_{L3}(x,y)$ is the secondary derived value for the pixel in the x th position along the row y in question; $f_{L2}(x,y)$ is the primary derived value for the associated pixel and $f_{L3}(x,y-1)$ is the secondary derived value, established the preceding iteration of the procedure, for the pixel which is the x th pixel in the preceding row y−1, but in the same column. Again $c_y$ is a tuning parameter between 0 and 1.

The secondary derived values resulting from Pass 3 are passed to a further processing stage where each secondary value is processed according to the equation:

$$f_{out}(x,y) = f(x,y) - \beta(f_{L3}(x,y) - DC_f(t)) + \gamma*DC_{residual} \quad (5)$$

where $DC_f(t)$ is the mean of the current input image, $$DC_{residual} = DC_{out}(t) - DC_f(t)$$

and $$DC_{out}(t) = (1-\lambda)*DC_{out}(t-1) + \lambda*DC_f(t),$$

where $f_{out}(x,y)$ is the enhanced pixel value for the pixel x,y in the enhanced image, f(x,y) is the corresponding raw pixel value, $DC_f$ is an average brightness value for the current frame, and $DC_{out}(t-1)$ is the calculated value of $DC_{out}$ for the previous frame.

The parameters β determines how much the edges are enhanced. A value of 1 makes a complete high pass image. The parameter γ controls how strong the flash compensation is. The adaptation rate of the flash compensation is determined by λ. There may be reasons to link β and γ to the scene information (dynamic range).

The intermediate derived values resulting from applying the procedure of equation 2 (Pass 1) could be used, without applying Pass 2 (Equation 3) as the respective secondary derived values to be processed by Pass 3. However, if this were done, the image finally displayed by display 16 would then have certain undesired artifacts, visible as a distortion of vertical edges of the image.

The order in which Pass 2 and Pass 3 are carried out could be reversed. If Pass 2 is not applied, the order in which Pass 1 and Pass 3 are carried out could also be reversed.

The process of equation 4 (Pass 3) may result in a similar distortion of horizontal edges in the displayed image, but this distortion is less serious in a system to facilitate navigation in a horizontal plane. However, if desired, this distortion may be alleviated by applying to the pixel values for a plurality of successive pixel rows of the notional pixel image represented by FIG. 2C, i.e. resulting from Pass 3, a reiterative procedure corresponding to Pass 2 above, but proceeding up pixel columns rather than along pixel rows. This procedure would however, increase the processing load and the memory capacity needed. To minimize processing and memory requirements, the number of rows treated in the respective pass in this way is preferably significantly less than the number of pixel rows in the frame image, (and, of course, includes the pixel row currently being processed).

Figure 3:
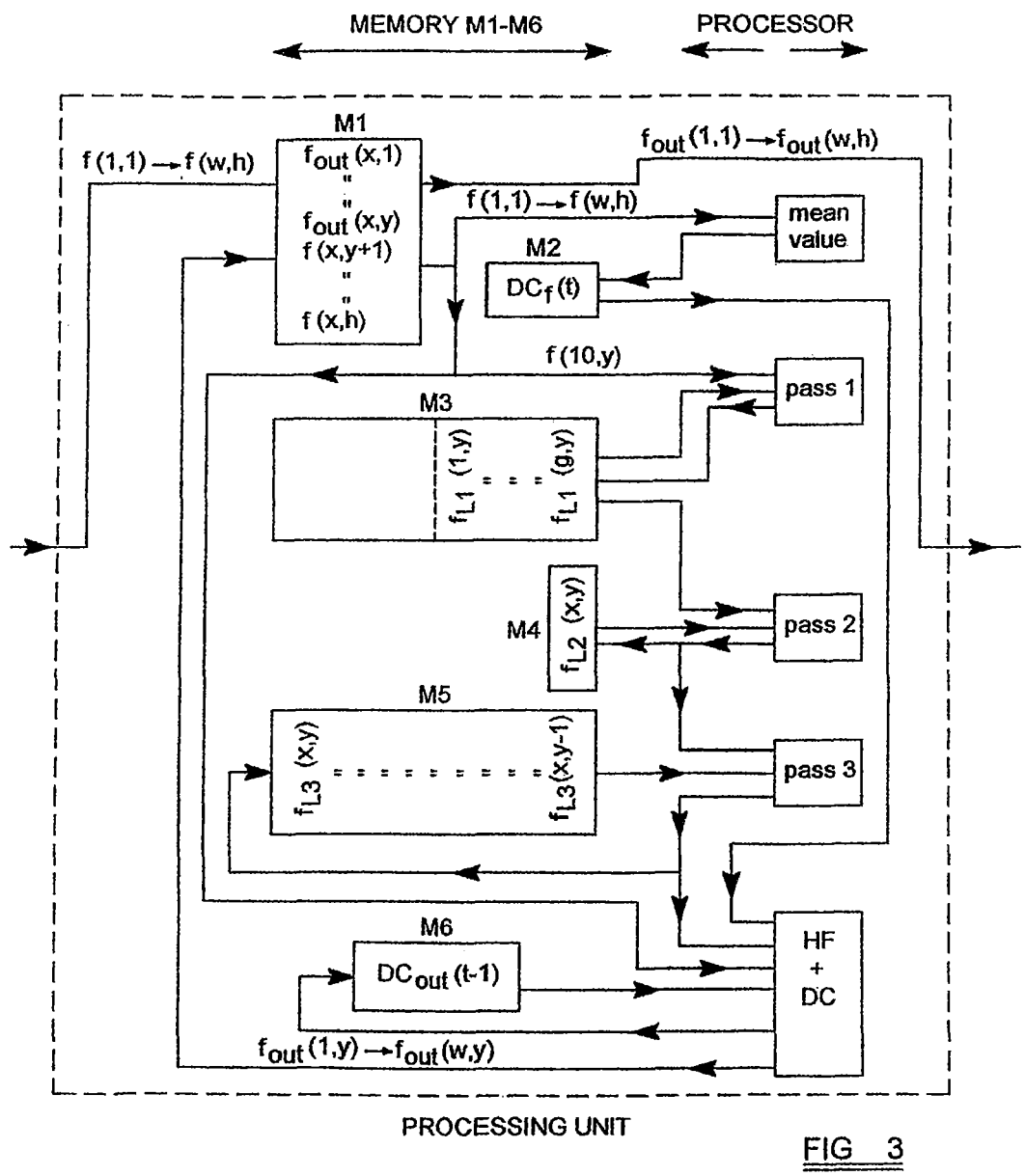
FIG. 3 is a block diagram of processing means forming part of the preferred embodiment of the invention.

The block diagram of FIG. 3 illustrates schematically the organization of the processing unit 14 in the preferred embodiment.

In this embodiment, the camera 10 supplies raw pixel values to the processing means 14, pixel value by pixel value, to be stored in a memory M1, (which may be, e.g. be flash memory) in the processing means 14.

The memory M1 has sufficient capacity for the pixel values for a whole video frame of h rows, each of w pixels (where h is the number of pixel rows in the frame and w is the number of pixels in each row). The incoming pixel values from the camera are stored in memory M1 until, at time t, all pixel values for the current frame have been stored in memory M1.

All values in memory M1 are then successively read by a processor section (schematically indicated in FIG. 3) of unit 14 which inter alia calculates $DC_f(t)$, the mean value of all f(x,y), in memory M1, and stores this quantity in memory M2. Then in Pass 1 the values from memory M1 and a further memory M3 are used to calculate the intermediate derived values $f_{L1}(x,y)$, storing these values in memory M3. When all pixels of the current row have been treated by Pass 1, and the respective values stored in M3, the last pixel value $f_{L1}(x,y)$ of that row will be treated by the procedure of Pass 2.

For the last pixel $f_{L2}(w,y) = f_{L1}(w,y)$. This value is entered in M4. Before applying Pass 2 on the next last pixel, both Pass 3 and pass HF+DC will be applied on the last pixel.

Pass 2 for the next last pixel will use equation (3) to create $f_{L2}(w-1,y)$, Which value will be entered in M4, overwriting the earlier $f_{L2}(w,y)$-value. Before applying pass 2 on the (w−2,y) pixel, again Pass 3 and pass HF+DC will be applied on the (w−1,y) pixel.

Pass 3 is calculated according to equation 4, using the values from M4 and M5. The result $f_{L3}(x,y)$ (the secondary derived value) is entered at the rear end of M5, to be used when the process has reach the next row. The result from Pass 3 is also directly used by pass HF+DC according to equation (5).

Pass HF+CD first calculates $DC_{out}(t)$, which is entered in M6, using $DC_f(t)$ from M2 and the old value of M6, $DC_{out}(t-1)$. Then $f_{out}(x,y)$ is calculated using values from Pass 3, M1, M2 and M6. The result is entered in M1, overwriting the corresponding f(x,y)-value.

When values $f_{out}(x,y)$ for all pixels have been entered to M1, all these values will be transferred to the display. The described arrangement, overwriting the corresponding raw values in memory M1, economizes on the use of memory.

The $f_{out}(x,y)$ values from memory M1, instead of being passed directly to the display, may be passed to another processing unit before being passed to the display. This other processing unit could analyze the image to identify relevant objects, which could be enhanced in the display. The processing unit could also map the filtered image to a smaller size, if it happens that the display does not have the same number or arrangement of pixels as the camera sensor, or if the display happens to be adapted to deal with, for example only 8 bit brightness values whilst the corresponding values from unit 14 are e.g. 14 bit values, this other processing unit could effect an appropriate conversion of the brightness values before these are passed to the display.

As noted above, memory M1 has the capacity for w times·h values, while M3 and M5 have the capacity for one row's pixel values and M2, M4 and M6 need only have capacity for one pixel value.

It will be understood that, where, in the above, reference is made to processing pixel row, for example in Pass 1 and Pass 2 from left to right, then from right to left, the processing could just as readily be carried out from right to left and then from left to right.

Likewise, it will be appreciated that whilst the terms "rows" and "columns" are used herein for convenience in relation to the image pixels, from a functional point of view the terms "rows" and "columns" are transposable without altering the validity of the above description. Put in another way, the apparatus will still, of course, operate as described, if the camera is turned through 90° about its optical axis.

As noted above, the various passes may be interleaved to some extent with a subsequent "pass" being carried out for some pixels before a preceding pass has been completed for other pixels, provided that such subsequent pass does not overwrite or corrupt values need by the "preceding pass". Such interleaving, as noted above, can be used to minimize processing and/or memory requirements.

When used in this specification and claims, the terms "comprises" and "comprising" and variations thereof mean that the specified features, steps or integers are included. The terms are not to be interpreted to exclude the presence of other features, steps or components.

The invention claimed is:

1. Imaging apparatus including a video camera comprising a sensor array and operable to produce successive video frames in the form of sensed images, the apparatus also comprising a processor for creating from said sensed images, low spatial frequency images in real time, each of said sensed image having a first predetermined number of rows of pixels and a second predetermined number of columns of pixels, the sensed image being processed row by row, the value of each pixel of said low spatial frequency image, being dependent on at least all earlier processed pixels of a current row and all earlier processed rows, but not dependent on pixels of rows located below a pixel row which is a third predetermined number of rows below the current row, said third predetermined number being less than one fifth of said first predetermined number.

2. Imaging apparatus according to claim 1 wherein the processor is so arranged that the low spatial frequency value of each pixel is derived from a value of a current pixel and at least the low spatial frequency values of earlier processed pixels of the same row and earlier processed pixels of the same column.

3. Imaging apparatus according to claim 2 wherein the processor is so arranged that a low spatial frequency value of each pixel is also derived from a low spatial frequency value of a succeeding pixel of a same row.

4. Imaging apparatus according to claim 1 wherein the processor is so arranged that the low spatial frequency value of each pixel is calculated in at least three steps, a first step processing pixels of the current row from left to right, a second step processing pixels of the current row from right to left and a third step processing all pixels of the current row with all pixels of a previous row.

5. Imaging apparatus according to claim 4 wherein the processor is so arranged that the low spatial frequency values of each row are also revised taking account of low spatial frequency pixel values of a later scanned row or rows.

6. Imaging apparatus according to claim 1 wherein said processor is further arranged to create a high spatial frequency image corresponding to each sensed image, by subtracting at least a fraction of each said low spatial frequency image from the corresponding sensed image.

7. Imaging apparatus according to claim 1 wherein said sensor array is sensitive to infrared radiation.

8. A method of obtaining a low special frequency images from the video output from a video camera comprising a sensor array and operable to produce successive video frames in the form of sensed images, each sensed image having a first predetermined number of rows of pixels and a second predetermined number of columns of pixels, the method including creating said low spatial frequency images from said sensed images, in real time, the method including processing the sensed image row by row, and deriving a value of each pixel of said low spatial frequency image, in such a way that said value of a current pixel is dependent on at least all earlier processed pixels of a current row and all earlier processed rows, but is not dependent on pixels of rows located below a pixel row which is a third predetermined number of rows below the current row, said third predetermined number being less than one fifth of said first predetermined number.

9. A method according to claim 8 wherein, each pixel having a respective brightness value associated therewith, the method includes the steps of, in real time, deriving from values for each sensed image, a set of values for a corresponding low spatial frequency image, by processing the rows of pixels in succession in an operation in which each row of pixels is processed pixel by pixel and in which operation there is developed, for each row of pixels of the sensed image, a series of primary derived values, each of which is associated with a respective pixel of that row and each of which primary derived values depends on the value of the corresponding pixel of the sensed image and also on a primary derived value associated with at least one adjacent pixel, in a same row, of the sensed image; and in which there is developed from said primary derived values respective secondary derived values, each of which is associated with a respective pixel of the sensed image and each of which secondary derived values depends upon the said primary derived value associated with the pixel and also on a said secondary derived value associated with at least one adjacent pixel in a same column of the image, whereby said secondary values constitute notional brightness values for corresponding pixels of said low spatial frequency image.

10. A method according to claim 9 wherein said primary derived values, for each pixel row are provided by an operation which includes, in a first pass, applying to each pixel value in turn, in progression in one direction along the row, a computational procedure represented by the equation:—

$$f_{L1}(x,y)=(1-c)*f(x,y)+c*f_{L1}(x-1,y)$$

where $f_{L1}(x,y)$ is an intermediate value derived for a pixel in x th position along row y in question; f(x,y) is the image value for an associated pixel; $f_{L1}(x-1,y)$ is the intermediate value, established in a preceding iteration of the procedure, for a pixel which is x−1 th pixel in the row, reckoned in said one direction, and c is a constant conductivity factor, less than 1, the operation further comprising, in a second pass, applying to each said pixel intermediate value in turn, in progression in the opposite direction along the row, a computational procedure represented by the equation:—

$$f_{L2}(x,y)=(1-c)*f_{L1}(x,y)+c*f_{L2}(x+1,y)$$

where $f_{L2}(x,y)$ is a primary derived value for the pixel in the x th position along the row y in question; still reckoned in said one direction, $f_{L1}(x,y)$ is the intermediate value for the associated pixel and $f_{L2}(x+1,y)$ is the primary derived value, established the preceding iteration of the procedure, for the pixel which is the x+1 th pixel in the row, still reckoned in said one direction.

11. A method according to claim 9 wherein said primary derived values, for each pixel row are provided by an operation which includes, in one pass, applying to each pixel raw value in turn, in progression in one direction along the row, a computational procedure represented by the equation:—

$$f_{L2}(x,y)=(1-c)*f(x,y)+c*f_{L2}(x-1,y)$$

where $f_{L2}(x,y)$ is the primary derived value derived for the pixel in the x th position along the row y in question; f(x,y) is the sensed image value for the associated pixel and $f_{L2}(x-1,y)$ is the primary derived value, established the preceding iteration of the procedure, for the pixel which is the x−1 th pixel in the row, reckoned in said one direction.

12. A method according to claim 10 wherein said secondary derived values, are derived by applying to the primary values for each said row of pixels the row and a preceding row a computational procedure represented by the equation:—

$$f_{L3}(x,y)=(1-c)*f_{L2}(x,y)+c*f_{L3}(x,y-1)$$

where $f_{L3}(x,y)$ is the secondary derived value for the pixel in the x th position along the row y in question; $f_{L2}(x,y)$ is the primary derived value for the associated pixel and $f_{L3}(x,y-1)$ is the secondary derived value or low spatial frequency value for the pixel which is the x th pixel in the preceding row, but in the same column.

13. A method according to claim 10, wherein said secondary derived values or low spatial frequency values are derived by applying to the primary values for each said row of a plurality of rows l, m, n of pixels a computational procedure represented by the equation:—

$$f_{L3}(x,y)=(1-c)*f_{L2}(x,y)+c*f_{L3}(x,y-1)$$

c is a constant conductivity factor, $f_{L3}(x,y)$ is a value for the pixel x in the row y which is the subject of the current iteration, $f_{L3}(x,y1)$ is the corresponding value for the pixel x in row y−1 which was the subject of the previous iteration, with successive rows l,m,n becoming the row y in the equation in successive said iterations, until the last pixel row in said plurality is reached, and wherein said plurality comprises significantly fewer rows than the total number of pixel rows in a said frame, followed by a reiterative computational procedure represented by the equation:—

$$f_{L4}(x,y)=(1-c)*f_{L3}(x,y)+c*f_{L4}(x,y+1)$$

where $f_{L4}(x,y)$ is a value for the pixel x in the row y which is the subject of the current iteration, $f_{L4}(x,y+1)$ is the corresponding value for the pixel x in row y−1 which was the subject of the previous iteration, with successive rows n,m,l becoming the row y in the equation in successive said iterations, until the first pixel row in said plurality is reached, when the value $f_{L4}$ for the respective pixel in that row becomes the respective said secondary derived value or low spatial frequency value, for that pixel.

14. A method of enhancing the video output from a video camera, of which said output comprises a succession of frames each in the form of a sensed image, comprising a plurality of pixels arranged in rows and columns, each pixel having a respective brightness value associated therewith, the method including the steps of, in real time, deriving from said values for each said sensed image, a set of values for corresponding low spatial frequency image, by the method of claim 8, and, in real time, producing a set of values for a corresponding enhanced frame image by a process including subtracting all or a fraction of each said low spatial frequency image value from the corresponding sensed image value, and operating a pixelated display in accordance with the enhanced image values, thereby to display said enhanced image.

15. A method according to claim 8 wherein, each pixel having a respective brightness value associated therewith, the method includes the steps of, in real time, deriving from said values for each sensed image, a set of values for a corresponding low spatial frequency image, by processing the pixel rows in succession in an operation in which there is developed, for each pixel row of the sensed image, a series of primary derived values, each of which is associated with a respective pixel of that row and each of which primary derived values depends on the value of the corresponding pixel of the sensed image and also on the primary derived value associated with the pixel in the corresponding position in the preceding pixel row of the sensed image; and in which there is developed from said primary derived values respective secondary derived values, each of which is associated with a respective pixel of the sensed image and each of which secondary derived values depends upon the said primary derived value associated with the pixel and also on a said secondary derived value associated with at least one adjacent pixel in the same row of the image, whereby said secondary values constitute notional brightness values for the corresponding pixels of said low spatial frequency image.

16. A method according to claim 15 wherein said primary derived values, for each pixel row are provided by an operation which includes applying to each pixel raw value, in turn, a computational procedure represented by the equation:—

$$f_{L1}(x,y)=(1-c)*f(x,y)+c*f_{L1}(x,y-1)$$

where $f_{L1}(x,y)$ is the primary value derived for the pixel in the x th position along the row y in question; f(x,y) is the sensed image value for the associated pixel; $f_{L1}(x,y-1)$ is the primary value, established in a preceding such operation, for the pixel which is the y−1 th pixel in the column x, and c is a constant conductivity factor, less than 1.

$$f_{L2}(x,y)=(1-c)*f_{L1}(x,y)+c*f_{L2}(x+1,y)$$

where $f_{L2}(x,y)$ is the primary derived value for the pixel in the x th position along the row y in question; still reckoned in said one direction, $f_{L1}(x,y)$ is the intermediate value for the associated pixel and $f_{L2}(x+1,y)$ is the primary derived value, established the preceding iteration of the procedure, for the pixel which is the x+1 th pixel in the row, still reckoned in said one direction.

17. A method according to claim 16 wherein said secondary derived values, for each pixel row are provided by an operation which includes, in a first pass, applying to each primary value in turn, in progression in one direction along the row, a computational procedure represented by the equation:—

$$f_{L2}(x,y)=(1-c)*f_{L1}(x,y)+c*f_{L2}(x-1,y)$$

where $f_{L2}(x,y)$ is an intermediate value derived for the pixel in the x th position along the row y in question; $f_{L1}(x,y)$ is the primary derived value for the associated pixel; $f_{L2}(x-1,y)$ is the intermediate value, established in a preceding iteration of the procedure, for the pixel which is the x−1 th pixel in the row, reckoned in said one direction, and c is a constant conductivity factor, less than 1, the operation further comprising, in a second pass, applying to each said pixel intermediate value in turn, in progression in the opposite direction along the row, a computational procedure represented by the equation:—

$$f_{L3}(x,y)=(1-c)*f_{L2}(x,y)+c*f_{L3}(x+1,y)$$

where $f_{L3}(x,y)$ is the secondary derived value for the pixel in the x th position along the row y in question; still reckoned in said one direction, $f_{L2}(x,y)$ is the intermediate value for the associated pixel and $f_{L3}(x+1,y)$ is the secondary derived value, established the preceding iteration of the procedure, for the pixel which is the x+1 th pixel in the row, still reckoned in said one direction.

18. A method according to claim 16 wherein said secondary derived values, for each pixel row are provided by an operation which includes, in one pass, applying to each primary value in turn, in progression in one direction along the row, a computational procedure represented by the equation:—

$$f_{L2}(x,y)=(1-c)*f_{L1}(x,y)+c*f_{L2}(x-1,y)$$

where $f_{L2}(x,y)$ is the secondary derived value derived for the pixel in the x th position along the row y in question; $f_{L1}(x,y)$ is the primary value for the associated pixel and $f_{L2}(x-1,y)$ is the secondary derived value, established a preceding iteration of the method, for a pixel which is x−1 th pixel in the row, in said one direction, and c is a constant conductivity factor, less than 1.

19. Imaging apparatus including a video camera the output of which comprises a succession of frames each in the form of a pixelated 2D pixel array and processor for deriving, in real time, from said output, respective enhanced image frames by the method of claim 8 and display means for displaying, in real time, a corresponding enhanced video view of the scene viewed by the camera.

20. Imaging apparatus according to claim 19 wherein said camera is an infra-red camera.

* * * * *